(12) United States Patent
Miller et al.

(10) Patent No.: US 8,429,718 B2
(45) Date of Patent: Apr. 23, 2013

(54) CONTROL PRODUCTION SUPPORT ACCESS

(75) Inventors: Andrew G. Miller, Land O'Lakes, FL (US); Tom C. Moreno, Tampa, FL (US); Michael D. Bullock, Tampa, FL (US); Greg T. Forrester, Lutz, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1234 days.

(21) Appl. No.: 11/747,635

(22) Filed: May 11, 2007

(65) Prior Publication Data

US 2008/0282326 A1    Nov. 13, 2008

(51) Int. Cl.
*H04L 29/06* (2006.01)

(52) U.S. Cl.
USPC .......... 726/4; 707/3; 707/204; 726/9; 726/17; 713/201; 705/9

(58) Field of Classification Search .............. 707/3, 204; 726/4, 9, 17; 713/201; 705/9
See application file for complete search history.

(56) References Cited

U.S. PATENT DOCUMENTS

| 6,643,783 | B2 * | 11/2003 | Flyntz ............................... 726/9 |
| 7,644,008 | B1 * | 1/2010 | Issa et al. ........................... 705/9 |
| 8,214,398 | B1 * | 7/2012 | Cowan et al. ................... 707/785 |
| 2006/0047720 | A1 * | 3/2006 | Kulkarni et al. ............... 707/204 |
| 2008/0256606 | A1 * | 10/2008 | Koikara et al. ..................... 726/4 |
| 2008/0271139 | A1 * | 10/2008 | Desai et al. ...................... 726/17 |

OTHER PUBLICATIONS

Ferraiolo et al., "A Role-Based Access Control Model and Reference Implementation Within a Corporate Intranet", 1999, pp. 33-64, ACM Transactions on Infrormation and System Security, vol. 2, No. 1, Feb. 1999.*

* cited by examiner

*Primary Examiner* — Jeffrey Pwu
*Assistant Examiner* — Hee Song

(57) ABSTRACT

A device creates a group for accessing a front door program that enables access to a secure resource, assigns, to the group, one or more permissions to perform one or more tasks associated with the secure resource, and adds a user to the group using identification information associated with the user, wherein the user is permitted to perform the one or more tasks based on the addition of the user to the group.

23 Claims, 6 Drawing Sheets

CONTROL PRODUCTION SUPPORT ACCESS

BACKGROUND

Organizations may own a number of secure resources to which they would like to potentially grant other parties access in a controlled manner. For example, an organization may permit an employee to access certain portions of an internal network, but may deny the same employee access to other portions of the internal network. However, organizations are continuously looking to prevent access to their internal network resources from untrustworthy endpoints (e.g., unauthenticated devices connected to the internal networks). A number of situations may arise where an organization may wish to dynamically control access to a secure resource, as well as have control over when and/or how the secure resource is being accessed. For example, an organization's employees (and/or contractors, consultants, etc.) may need to provide support services (e.g., execute root level commands) for multiple servers and/or multiple server software (i.e., secure resources), but may need to have knowledge of the root passwords for the multiple servers and/or multiple server software.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a user (e.g., a person or device seeking access to a secure resource) access to secure resources (e.g., an organization's servers and/or server software) based on a group assigned to the user. For example, in one implementation, a group may be created for accessing an application (e.g., a front door program) that permits access to one or more secure resources. Permission(s) for accessing the one or more secure resources may be assigned to the group. User identification information associated with one or more users may be added to the group. If a user's identification information is added to the group, the user may be capable of accessing the one or more secure resources associated with the group (e.g., via the permission(s) assigned to the group).

A "secure resource," as the term is used herein, is to be broadly interpreted to include any network, device, application, property, and/or combinations of networks, devices, applications, and/or properties to which access may be controlled. For example, a secure resource may include a secure or private network, an intranet, a local network, applications and/or devices provided in a secure network, an intranet, or a local network, personal web pages, email accounts, personnel files, sales forecasts, customer information, credit card numbers, proprietary business technological formulas, transactional data, any web site requiring a login, password, user name, etc., and/or any other network, device, application, and/or property that may require authorization and/or authentication.

Figure 1:
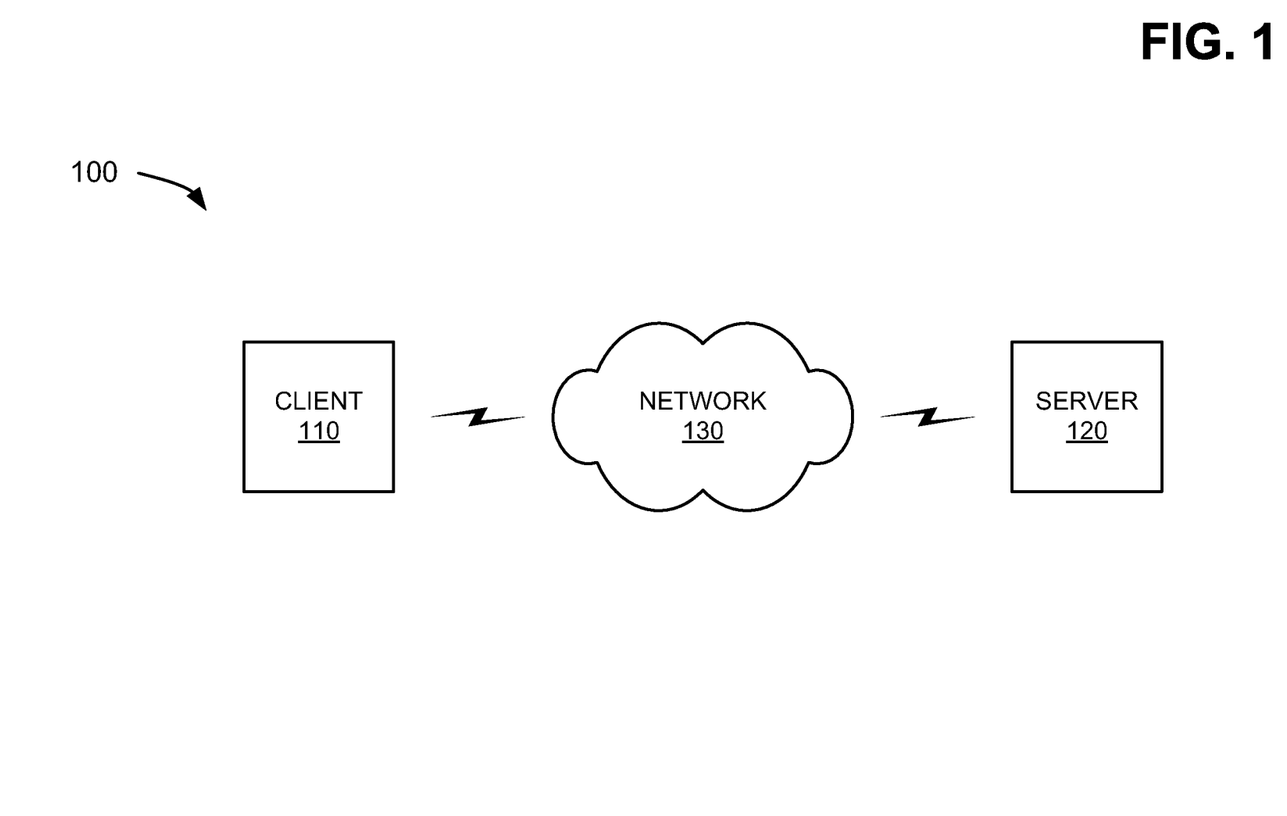
FIG. 1 is an exemplary diagram of a network in which systems and methods described herein may be implemented.

FIG. 1 is an exemplary diagram of a network 100 in which systems and methods described herein may be implemented. Network 100 may include a client 110 and a server 120 connected via a network 130. One client 110 and one server 120 have been illustrated in FIG. 1 as connected to network 130 for simplicity. In practice, there may be more clients and/or servers. Also, in some instances, a client may perform one or more functions of a server and a server may perform one or more functions of a client.

Client 110 may include one or more entities. An entity may be defined as a device, such as a telephone, a cellular phone (e.g., providing Internet-based applications, such as a WAP application), a personal computer, a personal digital assistant (PDA), a laptop, or another type of computation or communication device, a thread or process running on one of these devices, and/or an object executable by one of these devices. In one implementation, client 110 may enable server 120 to be configured to provide access to one or more secure resources, and/or to provide authorization/authentication of one or more secure resources in a manner described herein.

Server 120 may include one or more server entities that gather, process, search, and/or provide information in a manner described herein. For example, in one implementation, server 120 may be configured to provide access to one or more secure resources, and/or to provide authorization/authentication of one or more secure resources in a manner described herein.

Network 130 may include a local area network (LAN), a wide area network (WAN), a metropolitan area network (MAN), a telephone network, such as the Public Switched Telephone Network (PSTN) or a cellular telephone network, an intranet, the Internet, or a combination of networks. Client 110 and server 120 may connect to network 130 via wired and/or wireless connections.

Although FIG. 1 shows exemplary components of network 100, in other implementations, network 100 may contain fewer, different, or additional components than depicted in FIG. 1.

Figure 2:
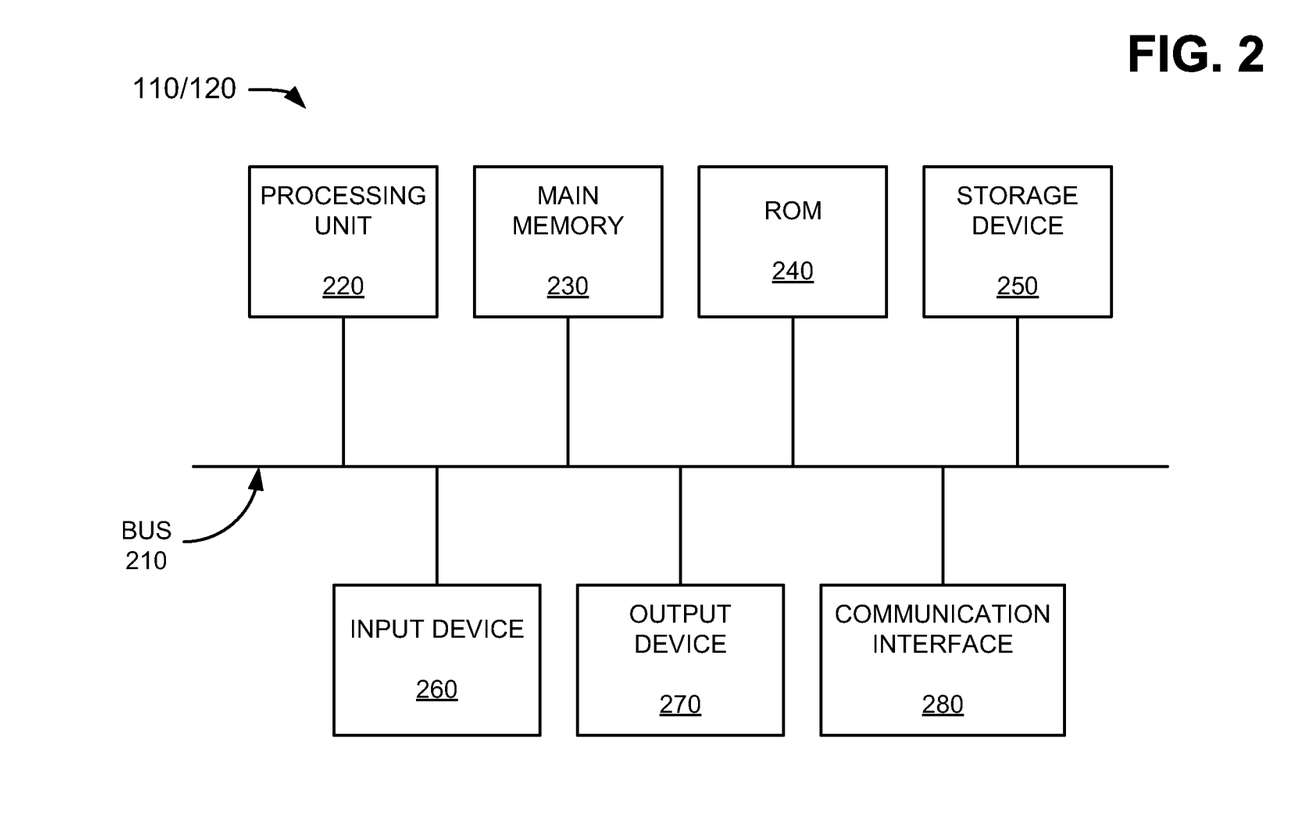
FIG. 2 is an exemplary diagram of a client and/or a server of FIG. 1.

FIG. 2 is an exemplary diagram of a client/server entity corresponding to client 110 and/or server 120. As illustrated, the client/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the client/server entity.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to the client/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 130.

As will be described in detail below, the client/server entity may perform certain operations in response to processing unit 220 executing software instructions contained in a computer-readable medium, such as main memory 230. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform the tasks performed by one or more other components of the client/server entity.

Figure 3:
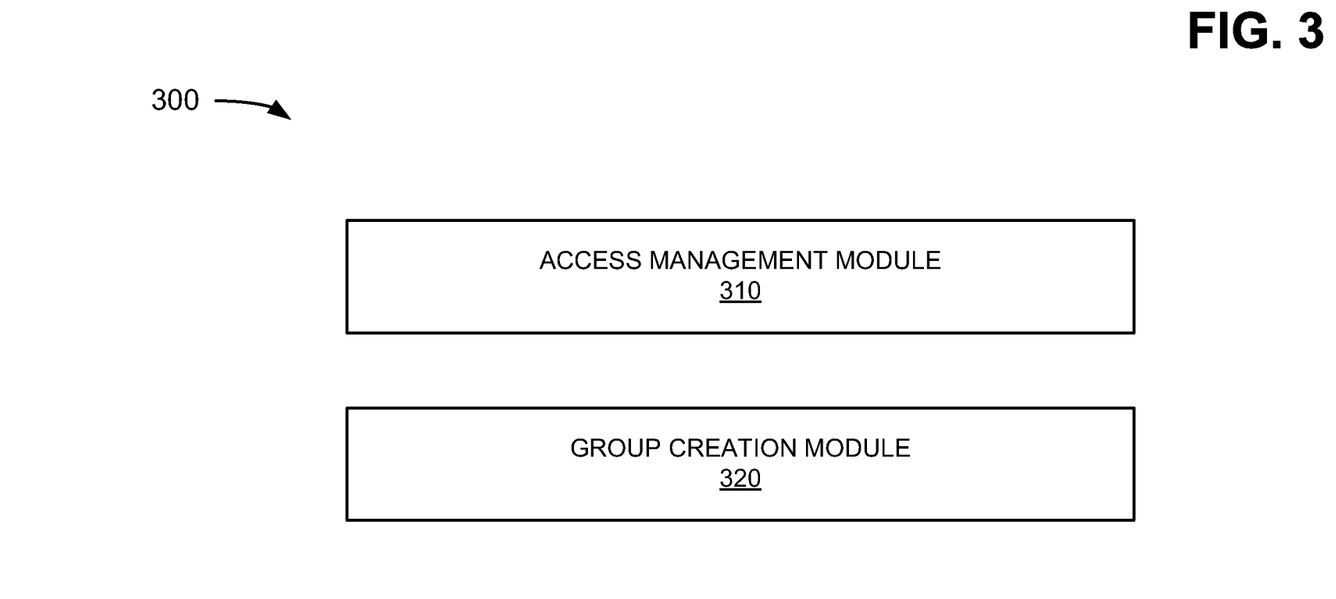
FIG. 3 is a diagram of a portion of an exemplary computer-readable medium that may be associated with the client and/or the server of FIGS. 1 and 2.

FIG. 3 is a diagram of a portion of an exemplary computer-readable medium 300 that may be associated with client 110 and/or server 120. In one implementation computer-readable medium 300 may correspond to main memory 230, ROM 240, and/or storage device 250 of client 110 and/or server 120. The portion of computer-readable medium 300 illustrated in FIG. 3 may include an access management module 310 and a group creation module 320. In one implementation, access management module 310 and group creation module 320 may be provided in server 120 (e.g., and may be accessible by client 110 via communication interface 280). In other implementations, access management module 310 may be provided in server 120 and group creation module 320 may be provided in client 110. In still other implementations, group creation module 320 may be incorporated into or be part of access management module 310.

Access management module 310 may provide an application that controls access to secure resources (e.g., provided on server 120). For example, in one implementation, access management module 310 may include eTrust™ Access Control™ software (formerly known as SEOS) for an operating system (e.g., UNIX, LINUX, Windows NT, etc.) provided on server 120. The eTrust™ Access Control™ software may control access to secure resources provided on server 120. In other examples, access management module 310 may provide any application that may control access to secure resources provided on server 120.

In one implementation, access management module 310 may improve the level of control that system administrators may have to protect secure resources. In another implementation, access management module 310 may help prevent unauthorized use of a superuser or root account, which may be a security challenge in an open system. A superuser or root account may be the term used for a special user account that may be controlled by a system administrator and may have rights or permissions in single-user and/or multi-user modes. In still another implementation, access management module 310 may help protect secure resources provided within a network (e.g., network 130). For example, network 130 may include one or more clients 110 and/or one or more servers 120 that contain secure resources, and access management module 310 may help protect the secure resources provided on these devices.

Group creation module 320 may permit groups to be established that may be granted access to predetermined secure resources provided with a network (e.g., network 130). In one implementation, group creation module 320 may permit creation of such a group using access management module 310. For example, the system administrator may create a group for the purpose of performing a project within network 130 (e.g., the group may be assigned the task of fixing a problem within server 120). In another implementation, group creation module 320 may grant permissions to access one or more secure resources. For example, the system administrator may grant the group permissions to perform predetermined tasks on one or more secure resources (e.g., information contained within server 120), without having to know the root password for server 120. In still another implementation, group creation module 320 may add users to the group. For example, the system administrator may add identification information (e.g., a user identification number or some other type of identification information) related to users determined to be associated with the project being performed within network 130.

Although FIG. 3 shows exemplary modules of computer-readable medium 300, in other implementations, computer-readable medium 300 may contain fewer, different, or additional modules than depicted in FIG. 3. In still other implementations, one or more modules of computer-readable medium 300 may perform the tasks performed by one or more other modules of computer-readable medium 300.

Figure 4:
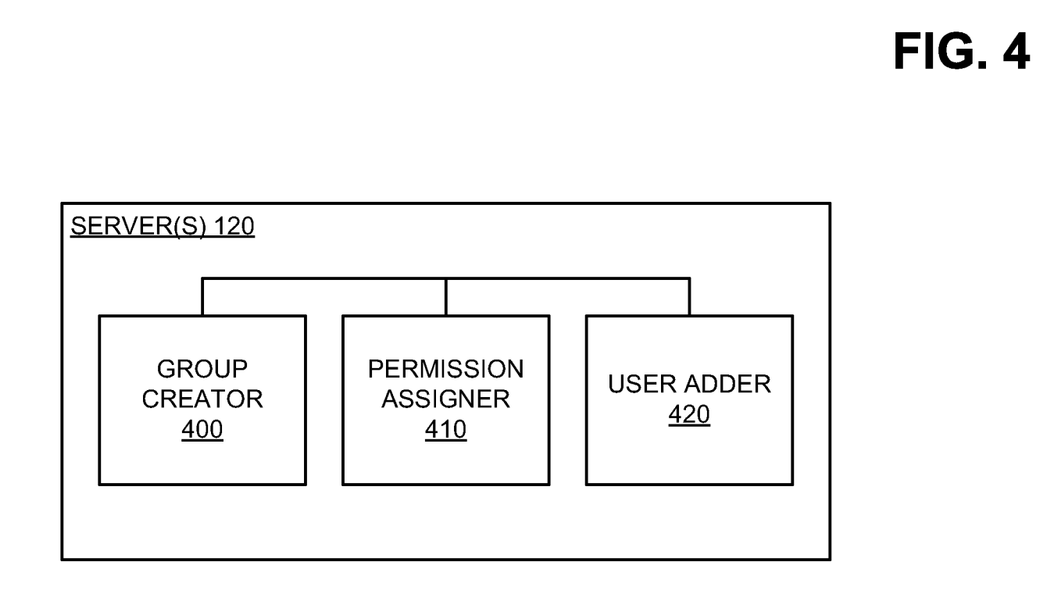
FIG. 4 is a diagram depicting exemplary functions capable of being performed by one or more servers (or one or more servers in conjunction with one or more clients) of FIGS. 1 and 2.

FIG. 4 is a diagram depicting exemplary functions capable of being performed by one or more servers 120 (or one or more servers 120 in conjunction with one or more clients 110). As illustrated, server 120 may include a variety of functional components, such as a group creator 400, a permission assigner 410, and/or a user adder 420. In one implementation, group creator 400, permission assigner 410, and user adder 420 may correspond to functions performed by a software application (e.g., group creation module 320) contained in a memory (e.g., main memory 230, ROM 240, and/or storage device 250) of server 120.

Group creator 400 may permit a user (e.g., a system administrator) to create a group using an access management application (e.g., access management module 310). In one implementation, the group created by group creator 400 may be permitted to access and run a front door program (e.g., a program called "vdsi_script"). In another implementation, the group may be prevented from running a default superuser program (e.g., a UNIX/LINUX "su" program). The group (e.g., chosen by the system administrator) may or may not have to be a valid group on server 120. For example, the group name may or may not exist in a directory (e.g., a directory named "/etc/group") of server 120. In other implementations, the group may be provided any name and/or may be created via a secure request (e.g., from an internal application used to access a secure resource, such as an Access Order Requesting System (AORS)). An example of an AORS comment section used by group creator 400 to create a group named "GROUP" may include the following:

Please create the access management group named "GROUP."

Please create this group on secure devices (selected above).

Please contact system administrator if you have any questions.

Permission assigner 410 may provide the group with one or more permissions to perform one or more predetermined tasks on one or more secure resources. For example, if the secure resources include one or more programs (e.g., provided on server 120), permission assigner 410 may grant the group one or more permissions to run the one or more programs as a functional account. In one implementation, the granting of permissions by permission assigner 410 may be accomplished via a secure request (e.g., an AORS request). In another implementation, the secure request may be performed once for each secure resource that is granted a permission (i.e., for which access is granted), via permission assigner 410. In still other implementations, permission assigner 410 may provide a single program, file, script, etc. (e.g., a Perl script) that grants permissions to perform multiple tasks on one or more secure resources and which may be used like a menu or a front door process.

Permission assigner 410 may provide any user (e.g., a first line support team member) of the group with access to any device of network 130 (e.g., server 120) so that the user may perform predetermined or classified activities or tasks. For example, the team members or users of a group may be provided with access to one or more servers 120 to carry out predetermined (e.g., Level 1, Level 2, etc.) first line support activities. In another example, the team members of the group may be provided access to one or more severs 120, but may be permitted to execute a predefined certain number of tasks as the functional account.

In one example, permission assigner 410 may install and configure a program (e.g., the Perl script) in the following manner. Permission assigner 410 may log into server 120 (e.g., as an application functional account), and may receive a copy of the Perl script file (e.g., "vdsi_script"), a configuration file (e.g., "vdsi_script.cfg"), and an environment setting file (e.g., "SetEnv.ksh") in a directory of server 120 (e.g., a safe directory, such as a directory named "/opt/gteadmin/VDSI") using the following exemplary commands:

```
mkdir /opt/gteadmin/VDSI
chmod 700 /opt/gteadmin/VDSI
cp vdsi_script /opt/gteadmin/VDSI
cp vdsi_script.cfg /opt/gteadmin/VDSI
cp SetEnv.ksh /opt/gteadmin/VDSI
```

Permission assigner 410 may provide restricted, safe permissions for the script file, the configuration file, and the environment setting file using the following exemplary commands:

```
chmod 700 /opt/gteadmin/VDSI/vdsi_script
chmod 600 /opt/gteadmin/VDSI/vdsi_script.cfg
chmod 700 /opt/gteadmin/VDSI/SetEnv.ksh
```

Permission assigner 410 may permit customization of the script file, the configuration file, and/or the environment setting file based on the system environment. For example, permission assigner 410 may permit customization using the following exemplary commands:

```
VDSI_LogFile = /opt/gteadmin/VDSI/vdsi_auditlog.txt
VDSI_SetEnv = /opt/gteadmin/VDSI/SetEnv.ksh
etc.,
``` where "vdsi_auditlog.txt" may include a private audit log that a system administrator may access to determine which users of the group accessed the script file.

Permission assigner 410 may determine whether the script file is using the correct version of Perl on server 120, and may receive a secure request (e.g., an AORS request) to permit members or users of the group to run the script file (e.g., to access a secure resource). Permission assigner 410 may allow members or users of the group to access the requested secure resource (e.g., via permission to run the script file). If a user (e.g., an individual with identification information "v123456") is added to the group, permission assigner 410 may permit testing of accessibility to a secure resource (e.g., server 120) that may be available to the user using the following exemplary commands:

```
/usr/seos/bin/sesudo /opt/gteadmin/VDSI/vdsi_script
/usr/seos/bin/sesudo /opt/gteadmin/VDSI/vdsi_script -?
/usr/seos/bin/sesudo /opt/gteadmin/VDSI/vdsi_script -v
/usr/seos/bin/sesudo /opt/gteadmin/VDSI/vdsi_script dir
```

Permission assigner 410 may provide a private audit log that a system administrator may access to determine which users of the group accessed the script file. For example, the system administrator may access the private audit log by accessing a text file (e.g., "vdsi_auditlog.txt") containing the private audit log with the following exemplary command:
cat/opt/gteadmin/VDSI/vdsi_auditlog.txt).
The script file may also include an audit log file that may contain information, such as which user performed what commands and when they performed such commands.

User adder 420 may add one or more users (e.g., via user identification information) to the group created by group creator 400. User identification information may include any information used to identify a user, such as an identification number (e.g., V123456, Z123456, etc.), personal login accounts for devices, etc. For example, user adder 420 may add user identification information related to one or more first line support team members having certain classifications (e.g., Level 1, Level 2, etc.) to the group. In one implementation, user adder 420 may add one or more users to a group via secure AORS requests. In other implementations, user adder 420 may add each user to a group via a corresponding secure AORS request. In other words, each user may be added to the group by user adder 420, via their own secure AORS request. An example of a secure AORS comment section used by user adder 420 to add an individual with identification information "v123456" to the group (e.g., "GROUP") may include the following:

Please add the person's login account (v123456) to the secure devices (selected above).
Please add this person's login account (v123456) to the access management group "GROUP" to enable this person to run this command as the functional account
"gteadmin": /usr/seos/bin/sesudo /opt/gteadmin/VDSI/vdsi_script.

Although FIG. 4 shows exemplary functional components of server 120, in other implementations, server 120 may contain fewer, different, or additional functional components than depicted in FIG. 4. In still other implementations, one or more functional components of server 120 may perform the tasks performed by one or more other functional components of server 120.

Figure 5:
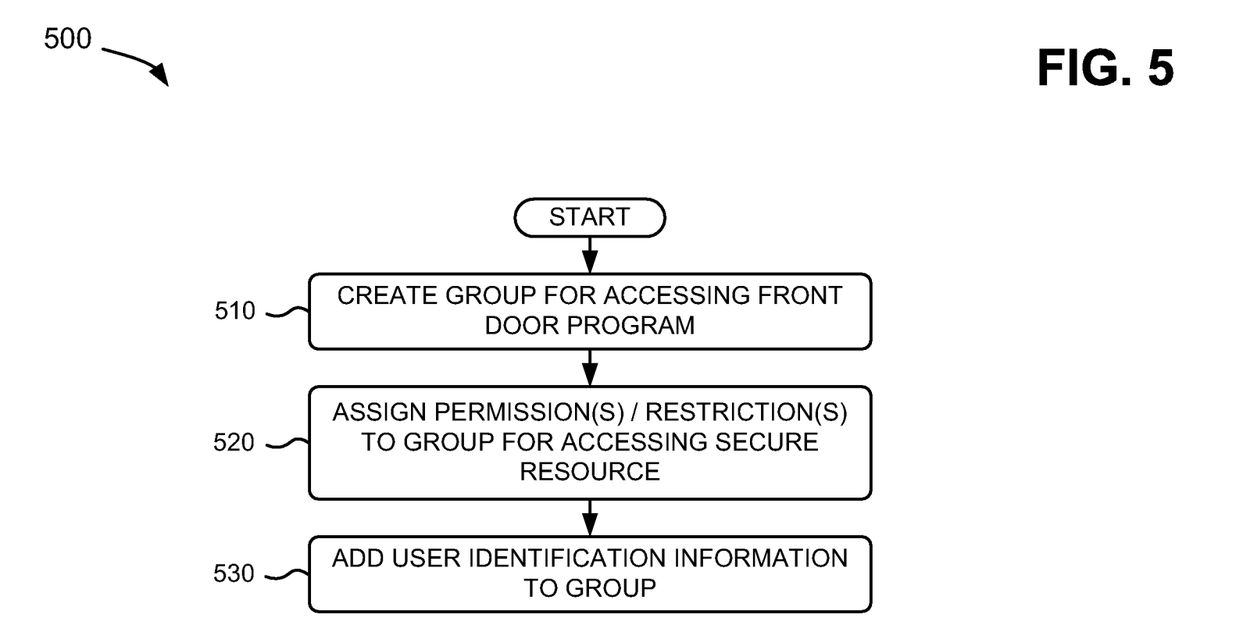
FIGS. 5 and 6 depict a flow chart of an exemplary process according to implementations described herein.
Figure 6:
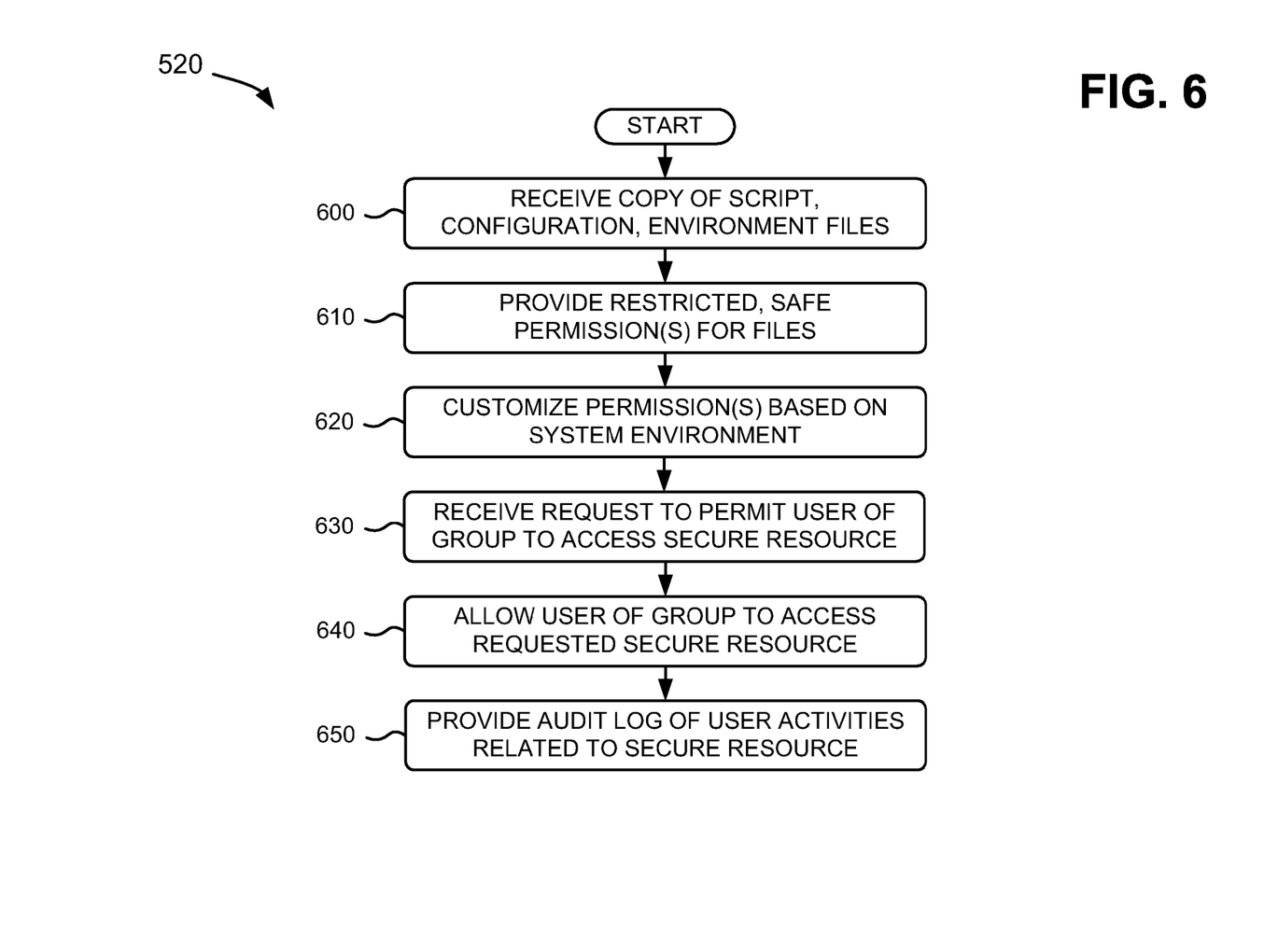

FIGS. 5 and 6 depict a flow chart of an exemplary process 500 according to implementations described herein. As shown in FIG. 5, process 500 may begin with creation of a group for accessing a front door program (block 510). For example, in one implementation described above in connection with FIG. 4, group creator 400 of server 120 may permit a user (e.g., a system administrator) to create a group using an access management application (e.g., access management module 310). The group created by group creator 400 may be permitted to access and run a front door program (e.g., a program called "vdsi_script"), and/or may be prevented from running a default superuser program (e.g., a UNIX/LINUX "su" program). The group may or may not have to be a valid group on server 120, may be provided any name, and/or may be created via a secure request (e.g., a secure AORS request).

One or more permissions and/or restrictions may be assigned to the group for accessing a secure resource (block 520). For example, in one implementation described above in connection with FIG. 4, permission assigner 410 of server 120 may assign the group one or more permissions to perform one or more tasks on one or more secure resources. The granting of permissions by permission assigner 410 may be accomplished via a secure request (e.g., an AORS request). The secure request may be performed once for each secure resource that is granted a permission (i.e., for which access is granted), via permission assigner 410. Permission assigner 410 may provide a program, file, script, etc. (e.g., a Perl script) that grants permissions to perform one or more tasks on one or more secure resources and which may be used like a menu or a front door process. Permission assigner 410 may provide any user of the group with access to any device associated with network 130 (e.g., server 120) so that the user may perform predetermined or classified activities or tasks. In another implementation, restrictions may be assigned (e.g., by permission assigner 410) to the group to provide an extra level of security and/or protection. Restrictions assigned to the group may include any security enhancement mechanism (e.g., a time limit for accessing a secure resource, a type of secure resource, activities that may performed by the group with the secure resource, one or more portions of the secure resource that may be accessed by the group, etc.).

As further shown in FIG. 5, user identification information may be added to the group (block 530). For example, in one implementation described above in connection with FIG. 4, user adder 420 of server 120 may add one or more users (e.g., via user identification information) to the group created by group creator 400. User identification information may include any information used to identify a user, such as an identification number (e.g., V123456, Z123456, etc.), personal login accounts for devices, etc. User adder 420 may add one or more users to a group via secure AORS requests.

Process block 520 may include the process blocks illustrated in FIG. 6. As shown in FIG. 6, process block 520 may include receipt of a copy of a script file, a configuration file, and an environment file (block 600). For example, in one implementation described above in connection with FIG. 4, permission assigner 410 may log into server 120 (e.g., as an application functional account), and may receive a copy of the Perl script file (e.g., "vdsi_script"), the configuration file (e.g., "vdsi_script.cfg"), and the environment setting file (e.g., "SetEnv.ksh") at a directory of server 120.

One or more restricted, safe permissions may be provided for the script file, the configuration file, and the environment file (block 610). For example, in one implementation described above in connection with FIG. 4, permission assigner 410 may provide restricted, safe permissions for the script file, the configuration file, and the environment setting file using the following exemplary commands:

```
chmod 700 /opt/gteadmin/VDSI/vdsi_script
chmod 600 /opt/gteadmin/VDSI/vdsi_script.cfg
chmod 700 /opt/gteadmin/VDSI/SetEnv.ksh
```

As further shown in FIG. 6, the one or more permissions may be customized based on a system environment (block 620). For example, in one implementation described above in connection with FIG. 4, permission assigner 410 may permit customization of the script file, the configuration file, and the environment setting file based on the system environment. For example, permission assigner 410 may permit customization using the following exemplary commands:

```
VDSI_LogFile = /opt/gteadmin/VDSI/vdsi_auditlog.txt
VDSI_SetEnv = /opt/gteadmin/VDSI/SetEnv.ksh
                        etc.,
``` where "vdsi_auditlog.txt" may include a private audit log that a system administrator may access to determine which users of the group accessed the script file. The system environment may include a variety of features (e.g., which may be used to customize the permissions granted), such as a number or type of secure resources available, a security level of the secure resources (e.g., low, medium, high, etc.), a project(s) to be completed by the group with access to the secure resources, a length of time associated with completion of the project(s), predetermined activities (e.g., Level 1, Level 2, etc.) to be carried out during the project(s), a location(s) of the users of the group, a security level associated with the users, etc.

A request to permit a user of a group to access a secure resource may be received (block 630), and the user of the group may be allowed to access the requested secure resource (block 640). For example, in one implementation described above in connection with FIG. 4, permission assigner 410 may receive a secure request to permit members of the group to run the script file (e.g., to access a secure resource). Permission assigner 410 may grant members of the group access to the requested secure resource (e.g., via permission to run the script file).

As further shown in FIG. 6, an audit log of user activities related to the secure resource may be provided (block 650). For example, in one implementation described above in connection with FIG. 4, permission assigner 410 may provide a private audit log that a system administrator may access to determine which users of the group accessed the script file. In one example, the system administrator may access the private audit log by accessing a text file (e.g., "vdsi_auditlog.txt") containing the private audit log. The script file may also include an audit log file that may contain information, such as which user performed what commands and when such commands were performed.

Implementations described herein may provide a user access to secure resources based on a group assigned to the user. For example, in one implementation, a group may be created for accessing an application that permits access to one or more secure resources. Permission(s) for accessing the one or more secure resources may be assigned to the group. User identification information associated with one or more users may be added to the group. If a user's identification information is added to the group, the user may be capable of accessing the one or more secure resources associated with the group.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 5 and 6, the order of the acts may be modified in other implementations. Further, non-dependent acts may be performed in parallel.

Also, the term "user" has been used herein. The term "user" is intended to be broadly interpreted to include a client or a user of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
    creating, by a processor associated with the server device, a group for accessing a front door program that enables access to one or more secure resources;
    providing, by the processor, a script file that grants permission, to a user, to perform one or more tasks on the one or more secure resources, the script file acting as the front door program;
    customizing, by the processor, the script file, a configuration file, and an environment setting file based on a system environment associated with the one or more secure resources, the system environment including information associated with:
        a quantity of the one or more secure resources that are available,
        a type of the one or more secure resources,
        a security level associated with the one or more secure resources, and
        a security level associated with the user,
    assigning, by the processor, one or more permissions to run the script file to the group, the assigning the one or more permissions including:
        providing, based on the system environment, one or more permissions for the script file, the configuration file, and the environment setting file; and
    adding, by the processor, the user to the group using identification information associated with the user, the user being permitted to run the script file based on the addition of the user to the group.

2. The method of claim 1, where creating the group comprises:
    creating the group using an access management application.

3. The method of claim 1, where creating the group comprises:
    creating the group via a secure request.

4. The method of claim 1, further comprising:
    providing one or more restricted permissions for the configuration file and the environment file.

5. The method of claim 4, where assigning, to the group, the one or more permissions further comprises:
    customizing the one or more restricted permissions based on the system environment.

6. The method of claim 1, where adding the user to the group comprises:
    receiving a secure request to permit the user access to the one or more secure resources; and
    permitting the user to run the script file based on the secure request.

7. The method of claim 1, further comprising:
    providing an audit log of activities associated with the user and related to the one or more secure resources.

8. The method of claim 1, where adding the user comprises:
    adding the user to the group using one of an identification number or a personal login account associated with the user.

9. The method of claim 1, where adding the user comprises:
    adding the user to the group via a secure request.

10. A device comprising:
    a memory to store a plurality of instructions; and
    a processor to execute the stored plurality of instructions to:
        create a group for accessing a front door program enabling access to one or more secure resources,
        provide a script file that grants permission to a user, by running the script file, to perform one or more tasks on the one or more secure resources, the script file acting as the front door program,
        customize the script file, a configuration file, and an environment setting file based on a system environment associated with the one or more secure resources, the system environment including information associated with:
            a quantity of the one or more secure resources that are available,
            a type of the one or more secure resources,
            a security level associated with the one or more secure resources, and
            a security level associated with the user,
        assign, to the group, one or more permissions to run the script file, when assigning the one or more permissions, the processor being further to:
            provide, based on the system environment, one or more permissions for the script file, the configuration file, and the environment setting file, and
        add the user to the group.

11. The device of claim 10, where, when creating the group, the processor is further to:
    create the group using an access management application.

12. The device of claim 10, where, when creating the group, the processor is further to:
create the group via a secure request.

13. The device of claim 10, where the processor is further to:
provide restricted permissions for the configuration file and the environment file; and
customize the restricted permissions based on the system environment.

14. The device of claim 10, where the processor is further to:
receive a secure request to permit the user access to the one or more secure resources;
permit the user access to the one or more secure resources based on receiving the secure request; and
provide an audit log of activities associated with the user and related to the one or more secure resources.

15. The device of claim 10, where, when adding the user to the group, the processor is further to:
add the user to the group based on identification information associated with the user.

16. The device of claim 10, where, when adding the user to the group, the processor is further to:
add the user to the group via a secure request.

17. A non-transitory computer-readable medium that stores computer-executable instructions, the instructions comprising:
one or more instructions which, when executed by a processor, cause the processor to create a group for accessing a front door program enabling access to one or more secure resources;
one or more instructions which, when executed by the processor, cause the processor to provide a script file that grants permission to a user, by running the script file, to perform one or more tasks on the one or more secure resources, the script file acting as the front door program;
one or more instructions which, when executed by the processor, cause the processor to customize the script file, a configuration file, and an environment setting file based on a system environment associated with the one or more secure resources, the system environment including information associated with:
a quantity of the one or more secure resources that are available,
a type of the one or more secure resources,
a security level associated with the one or more secure resources, and
a security level associated with the user;
one or more instructions which, when executed by the processor, cause the processor to assign, to the group, one or more permissions to run the script file, the one or more instructions to assign the one or more permission including:
one or more instructions which, when executed by the processor, cause the processor to provide, based on the system environment, one or more permissions for the script file, the configuration file, and the environment setting file; and
one or more instructions which, when executed by the processor, cause the processor to add the user to the group using identification information that identifies the user.

18. The non-transitory computer-readable medium of claim 17, where the one or more instructions to create the group further comprise:
one or more instructions to create the group using an access management application.

19. The non-transitory computer-readable medium of claim 17, where the one or more instructions to create the group further comprise:
one or more instructions to create the group via a secure request.

20. The non-transitory computer-readable medium of claim 17, where the instructions further comprises comprise:
one or more instructions to provide a restricted permission for the configuration file and the environment setting file; and
one or more instructions to customize the restricted permissions based on at least one of a type of the one or more secure resources, a security level of the one or more secure resources, a project to be completed by the group, a length of time associated with completion of the project, a predetermined activity to be carried out during the project, a location of the user, or a security level associated with the user.

21. The non-transitory computer-readable medium of claim 17, where the instructions further comprises comprise:
one or more instructions to provide an audit log associated with activities of the user related to the one or more secure resources.

22. The non-transitory computer-readable medium of claim 17, where the one or more instructions to add the user to the group further comprise:
one or more instructions to add the user to the group via one of an identification number or a personal login account.

23. The non-transitory computer-readable medium of claim 17, where the one or more instructions to add the user to the group further comprise:
one or more instructions to add the user to the group via a secure request.

* * * * *